United States Patent [19]
Sakai et al.

[11] Patent Number: 6,081,251
[45] Date of Patent: Jun. 27, 2000

[54] APPARATUS AND METHOD FOR MANAGING PICTURE DATA

[75] Inventors: Yorihiko Sakai, Tokyo; Osamu Ota; Kouhei Sakura, both of Kanagawa, all of Japan

[73] Assignee: Sony Corporation, Tokyo, Japan

[21] Appl. No.: 08/437,497

[22] Filed: May 9, 1995

Related U.S. Application Data

[63] Continuation of application No. 08/130,468, Oct. 1, 1993.

[30] Foreign Application Priority Data

Oct. 7, 1992 [JP] Japan .................................. 4-268973

[51] Int. Cl.[7] .................................................. G09G 5/00
[52] U.S. Cl. .......................... 345/127; 345/129; 382/306; 707/104
[58] Field of Search .................................. 345/202, 127, 345/129; 382/305, 306; 707/104

[56] References Cited

U.S. PATENT DOCUMENTS

| | | | |
|---|---|---|---|
| 3,641,555 | 2/1972 | Griffin | 345/156 |
| 4,302,776 | 11/1981 | Taylor et al. | 358/160 |
| 4,698,664 | 10/1987 | Nichols et al. | 358/10 |
| 4,752,773 | 6/1988 | Togawa et al. | 345/185 |
| 4,805,119 | 2/1989 | Maeda et al. | 364/518 |
| 4,920,337 | 4/1990 | Kuo | 345/185 |
| 5,019,975 | 5/1991 | Mukai . | |
| 5,077,607 | 12/1991 | Johnson et al. | 348/13 |
| 5,142,667 | 8/1992 | Dimperio et al. | 395/115 |
| 5,146,600 | 9/1992 | Sugiura . | |
| 5,251,324 | 10/1993 | McMullan | 358/84 |
| 5,313,572 | 5/1994 | Yamamoto et al. | 395/145 |
| 5,373,307 | 12/1994 | Shirashi | 345/185 |
| 5,465,119 | 11/1995 | Demos | 348/447 |

FOREIGN PATENT DOCUMENTS

| | | |
|---|---|---|
| 0 327 931 | 8/1989 | European Pat. Off. . |
| 0 382 541 | 8/1990 | European Pat. Off. . |

*Primary Examiner*—Bipin H. Shalwala
*Assistant Examiner*—Ricardo Osorio
*Attorney, Agent, or Firm*—Frommer Lawrence & Haug, LLP; William S. Frommer

[57] ABSTRACT

An apparatus for managing picture data receives picture data representing a number of pictures at different times, generates a time code indicating the time of receipt of each picture, and stores the received picture data with a header that includes the time code. In order to retrieve selected pictures, retrieval parameter information is entered to indicate a selected time period, and the picture data that was received during the selected time period is retrieved. The apparatus also forms reduced size picture data for each received picture and stores the reduced size picture data in the header together with the time code for the corresponding picture. Upon retrieving selected ones of the stored pictures, the corresponding reduced size picture data is used to display simultaneously several reduced size pictures representing the pictures that have been retrieved.

58 Claims, 5 Drawing Sheets

FIG.3(b)

APPARATUS AND METHOD FOR MANAGING PICTURE DATA

This application is a continuation of application Ser. No. 08/130,468, filed Oct. 1, 1993.

BACKGROUND OF THE INVENTION

1. Field of the Invention

This invention relates to a method and apparatus for managing a database of picture data, and more particularly to a method and apparatus for facilitating storage and retrieval of picture data in a workstation or a personal computer.

2. Description of the Prior Art

It is known to provide databases of information stored in computers in which key words are used for classifying and retrieving the data. For example, when the database includes a dictionary, defined words are used as keys and, in response to input of a desired key word, information is retrieved which includes sentences defining the key word and perhaps also drawings. As another example, when the database includes a library, one or more of book titles, authors' names, names of publishers, dates of publication, and/or words indicating the subject matter of the books, may be used as key words.

It is also sometimes desired that data representative of pictures be stored in a database and retrieved on the basis of key words. For example, television stations or newspapers may maintain a database of pictures to be selected for broadcasting or for publication in a newspaper. It is known to index a picture database by key words that have been individually assigned to each picture so that the desired picture, or more specifically data corresponding thereto, may be retrieved on the basis of the assigned key words.

One drawback of known picture indexing systems is the need to perform a time-consuming process of assigning a unique key word to each picture at the time it is stored in the database.

Another disadvantage is that in known systems, the pictures retrieved on the basis of an input key word are displayed sequentially, one at a time, so that the selection of a particular one of the retrieved pictures is slow and inconvenient.

OBJECTS AND SUMMARY OF THE INVENTION

Accordingly, it is an object of the present invention to provide an apparatus and method for storing and retrieving picture data in which a desired picture may be retrieved quickly, with the picture itself being used as a key.

It is a further object to provide an apparatus and method for managing picture data in which the storage of picture data may be performed quickly and easily.

In accordance with an aspect of the present invention, there is provided a picture data management apparatus for storing and retrieving picture data, including means for receiving respective picture data representative of a plurality of pictures, means for generating a respective time code indicative of the time of receipt of the respective picture data for each of the plurality bf pictures, means for storing the respective received picture data for each of the plurality of pictures in association with the time code corresponding to the respective picture data, means for entering retrieval parameter information indicative of a selected time period, and means for retrieving the stored picture data that was received during the selected time period.

According to another aspect of the invention, there is provided a picture data management apparatus for storing and retrieving picture data, including means for receiving respective picture data representative of a plurality of pictures, reduced size picture means for forming reduced size picture data for each of the plurality of pictures, means for storing the respective received picture data for each one of the plurality of pictures in association with the reduced size picture data corresponding to the plurality of pictures, means for retrieving the stored picture data and the associated reduced size picture data corresponding to selected ones of the plurality of pictures, and means for simultaneously displaying a plurality of reduced size pictures corresponding to the retrieved reduced size picture data.

According to still another aspect of the invention, there is provided a picture data management apparatus for storing and receiving picture data, including means for receiving respective picture data representative of a plurality of pictures, reduced size picture means for forming reduced size picture data for each of the plurality of pictures, means for assigning respective key word data for each of the plurality of pictures, means for storing the respective received picture data in association with respective header data, the respective header data including the reduced size picture data and the assigned key word data corresponding to the respective received picture data, means for entering retrieval data, means for retrieving the stored picture data corresponding to the stored key word data that conforms to the entered retrieval data, means for reading out from the means for storing the reduced size picture data corresponding to the retrieved picture data, and means for displaying the read-out reduced size picture data. According to the latter aspect of the present invention, the picture data management apparatus preferably includes means for generating a respective time code indicative of a time of receipt of the respective picture data for each of the plurality of pictures, and the respective time code makes up at least part of the respective key word data for each of the plurality of pictures. In this case the retrieval data preferably includes retrieval parameter information indicative of a selected time period.

According to further aspects of the invention, there is provided a method of storing and retrieving picture data including the steps of receiving respective picture data representative of a plurality of pictures, storing the received picture data, indexing the stored picture data in accordance with respective times at which the picture data was received or stored, and retrieving such portions of the indexed and stored picture data as were received or stored during a selected time period.

According to yet another aspect of the invention, there is provided a method of storing and retrieving picture data, including the steps of storing respective picture data representative of a plurality of pictures, associating the respective picture data for each of the pictures with a respective time, selecting a retrieval time period, and retrieving the respective picture data associated with times that are included in the retrieval time period.

According to still another aspect of the invention, there is provided a method of storing and retrieving picture data, including the steps of storing respective picture data representative of a plurality of pictures, retrieving the stored picture data corresponding to selected ones of the plurality of pictures, forming respective reduced size picture data for at least some of the plurality of pictures, and displaying simultaneously a plurality of reduced size pictures on the basis of the reduced size picture data which corresponds to the selected ones of the plurality of pictures.

The foregoing apparatus and methods according to this invention are advantageous in that the time of receipt of picture data may be automatically used as key word or indexing information without a significant effort on the part of the user, and then the stored pictures can be retrieved on the basis of the time-of-receipt key words. Moreover, by simultaneously displaying reduced pictures representing a plurality of retrieved pictures, selection from among the retrieved pictures can be carried out quickly and conveniently.

The above, and other objects, features and advantages of the present invention will be apparent from the following detailed description thereof which is to be read in connection with the accompanying drawings.

DETAILED DESCRIPTION OF THE PREFERRED EMBODIMENTS

A picture data management system in accordance with the present invention will now be described with reference to the drawings, and initially with reference to FIG. 1. The system illustrated in FIG. 1 may be employed, for example, to provide a database of pictures at a newspaper publishing office.

Figure 1:
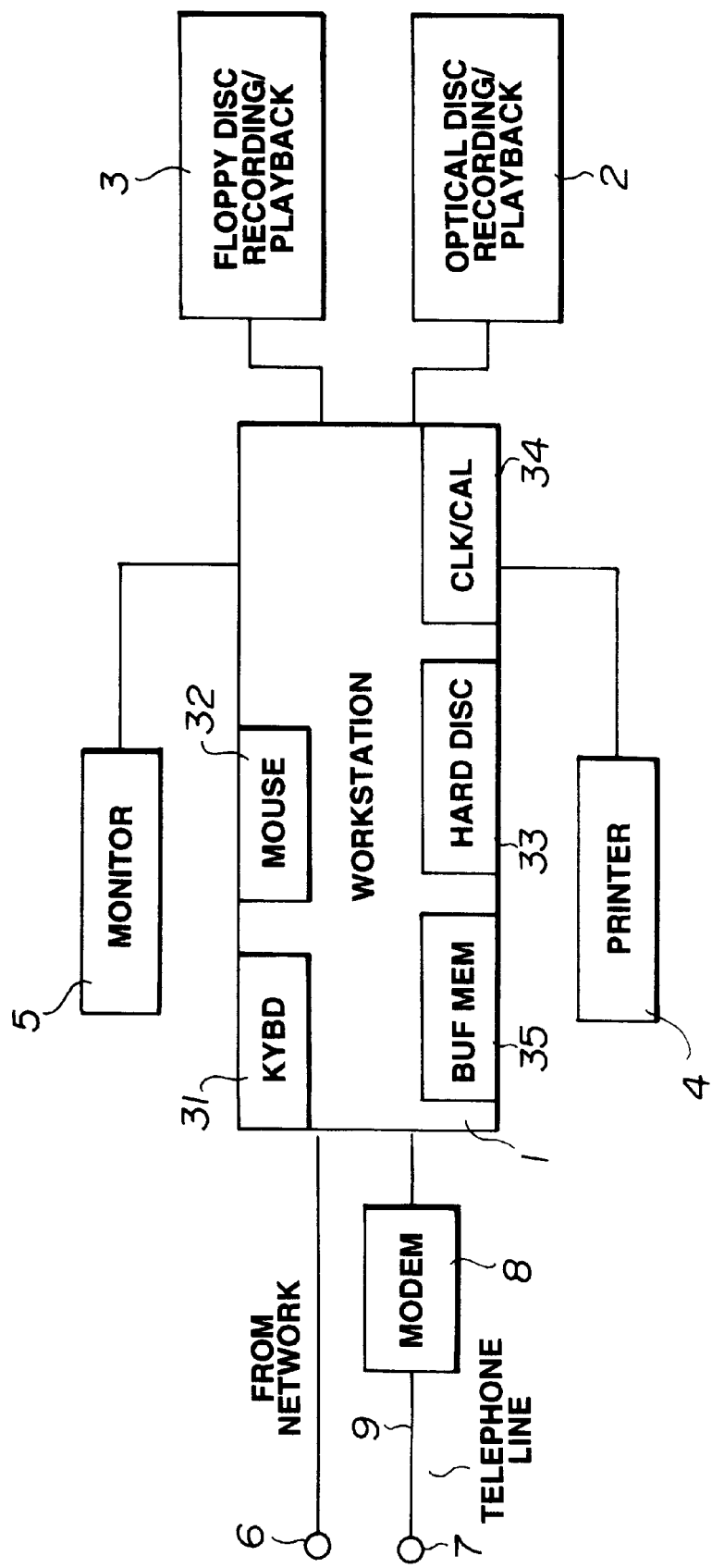
FIG. 1 is a block diagram of a picture data management apparatus in accordance with the present invention.

The picture data management system shown in FIG. 1 includes a workstation 1 which provides the management functions for the picture database, optical disk recorder/reproducer 2 for recording and/or reproducing picture data on or from an optical disk, a magnetic disk drive, such as a floppy disk drive 3 for recording and/or reproducing picture data on or from a floppy disk, a printer 4 for printing pictures on the basis of picture data managed by the system, and a monitor 5 for displaying pictures on the basis of the picture data managed by the system.

The workstation 1 is connected to a data network via a data terminal 6 and is also connected to a telephone line via a telephone terminal 7 and a modem 8. Workstation 1 is arranged to selectively receive picture data from either the data network or the telephone line.

The workstation 1 includes a keyboard 31, a mouse 32, a hard disk drive 33, a clock/calendar module 34 for providing current date and time information, and a buffer memory 35, as well as conventional features, which are not shown, such as a CPU, program storage memory, working memory, data ports and so forth. The buffer memory 35, the working memory and the program storage memory may all be embodied, for example, in conventional read/write memory such as RAM. The workstation 1 preferably operates under control of multi-tasking operating system software.

Operation of the picture data management system of FIG. 1 for the purpose of receiving and storing picture data will now be described with reference to the flow chart shown in FIG. 2.

Figure 2:
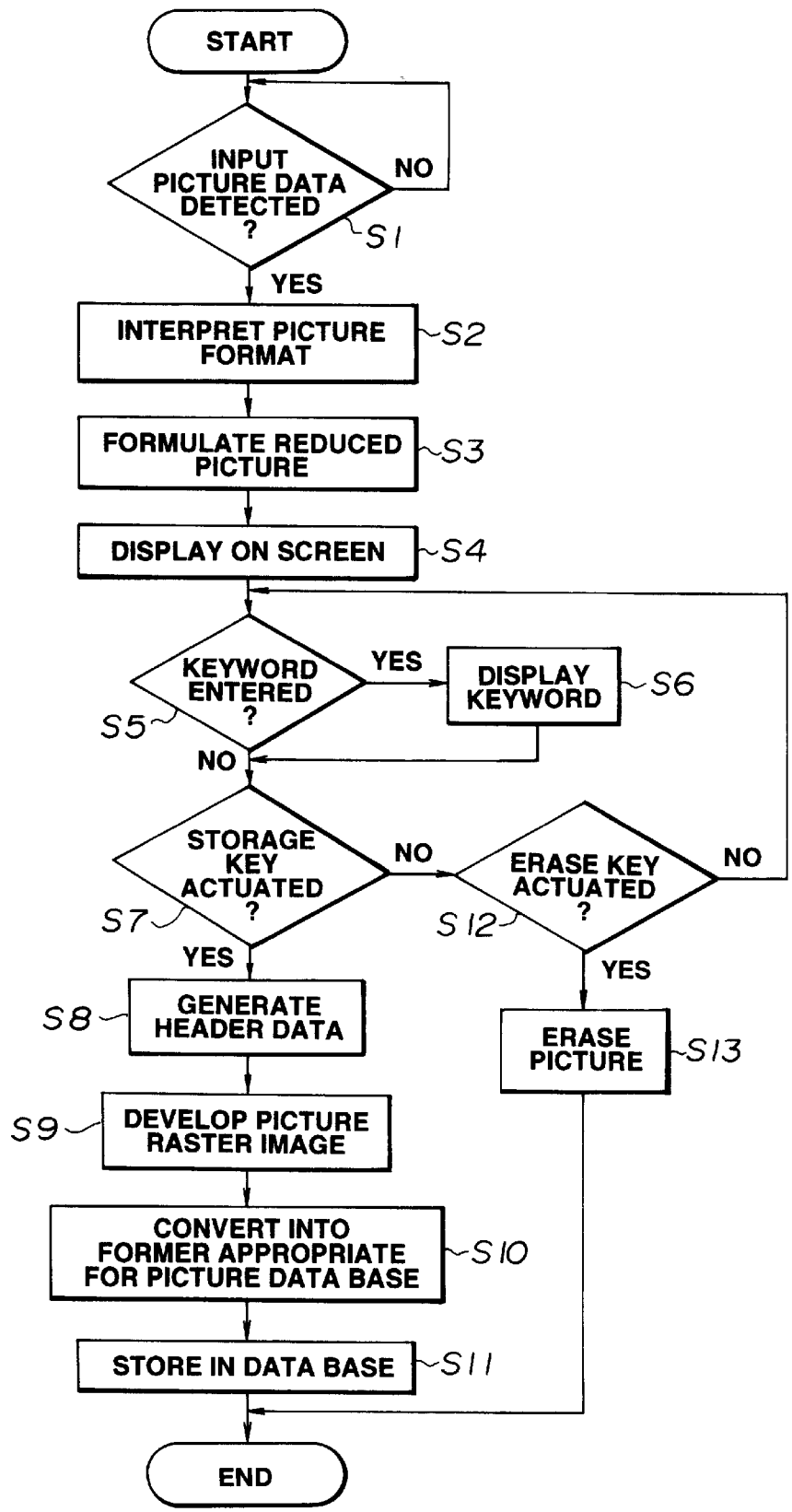
FIG. 2 is a flow chart that illustrates a procedure for receiving and storing picture data in accordance with the present invention in the apparatus of FIG. 1.

The procedure of FIG. 2 begins when the power supply for workstation 1 is turned on, and the procedure then advances to step S1, at which receipt of picture data is awaited. At step S1, if it is determined that picture data is being received either via terminal 6 or terminal 7, then the procedure advances to step S2, at which the workstation 1 analyzes the format of the picture data that has been received. In a preferred embodiment of the invention, workstation 1 is adapted to receive and analyze data in a raster-scanning format and also in such conventional picture formats as tag information file format (TIFF) and PICT.

Figure 3A:
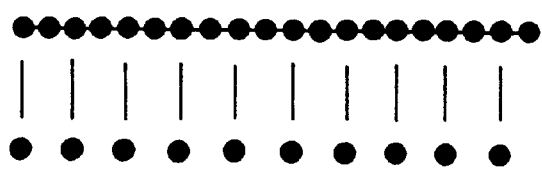
FIGS. 3 and 4 are schematic illustrations of respective techniques for forming reduced size picture data from received picture data in the apparatus of FIG. 1.
Figure 4A:
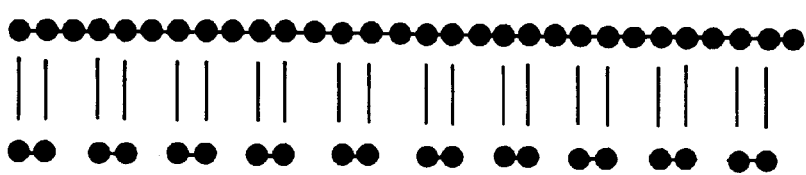
Figure 4B:

Step S2 is followed by step S3, at which the workstation 1 forms reduced size picture data on the basis of the picture data that has been received. In connection with step S3, workstation 1 determines the size of the received picture data, in pixels, and forms therefrom the reduced size picture data which, in a preferred embodiment, takes the form of a two-dimensional array of about 160 pixels by 160 pixels. The reduction in size of the received picture data to form the reduced-size picture data is preferably carried out by a thinning out process, of which examples are illustrated in FIGS. 3 and 4. For example, FIG. 3 illustrates a thinning out of 20 pixels arrayed in a horizontal direction, as shown at (a) in FIG. 3, to produce a horizontal array of 10 pixels, as shown at (b), by simply eliminating every other pixel in the 20 pixel array. Thus, in FIG. 3, a 2-to-1 thinning out procedure is illustrated. A similar procedure, but with a reduction rate of 3-to-2 is illustrated in FIG. 4, in which a horizontal array of 30 input pixels, as shown at (a) of FIG. 4, is thinned out by dropping every third pixel to form a horizontal array of 20 pixels, as shown at (b) in FIG. 4.

It will be appreciated that the thinning out is, in general, carried out in the vertical direction, as well as in the horizontal direction illustrated in FIGS. 3 and 4. It will also be understood that a greater reduction rate than 2-to-1, or a smaller reduction rate than 3-to-2, or a rate between these two rates, will be performed as necessary to reduce the received picture data to the desired reduced array size of approximately 160×160. It should also be understood that each of the horizontal and vertical thinning out operations may be performed all in one step, or in a series of horizontal or vertical thinning out operations, as the case may be. Moreover, the horizontal and vertical thinning out operations may be performed together or in separate operations.

Formation of reduced picture data in this manner can be performed rapidly, while producing picture data that may be displayed with adequate picture quality for the operator to perform desired functions using the picture data management system.

Following step S3 is step S4, at which the reduced size picture data formed at step S3 is displayed via the monitor 5. The monitor 5 is preferably of a high resolution type, having, for example, 1280×1024 pixels, so that the reduced pictures shown in the approximately 160×160 arrays can be recognized easily by the operator. It will be understood that the foregoing pixel array sizes mentioned with respect to monitor 5 and the preferred size of the reduced size pictures are merely illustrative, and that the present invention is not limited thereto.

Figure 5:
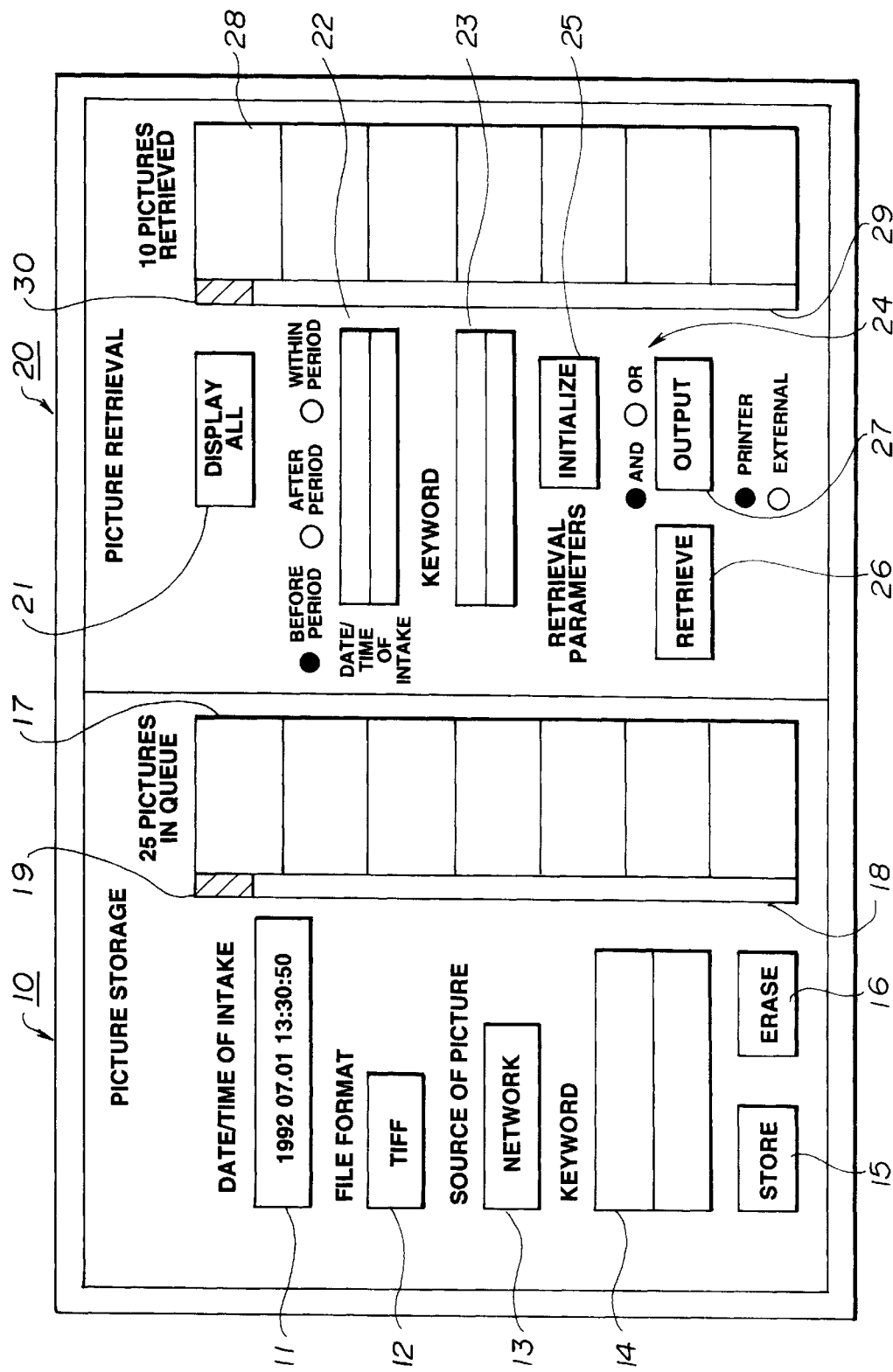
FIG. 5 is an illustration of a screen display provided by the apparatus of FIG. 1 for simultaneously displaying picture storage information and picture retrieval information in accordance with the present invention.

FIG. 5 illustrates a screen display format in which the reduced size pictures are displayed on monitor 5 in accordance with a preferred embodiment of the invention. The display screen shown in FIG. 5 is in a split-screen format, including a left-hand portion 10 for displaying information relating to picture storage operations, and a right-hand portion 20 for displaying information relating to picture retrieval operations, which will be described later. Alternatively, the retrieval operation information may be presented in the left-hand portion, and the storage operation information in the right-hand portion. As another alternative, the screen may be split into upper and lower portions with storage information in the upper portion and retrieval information in the lower portion, or vice versa. As still other alternatives, respective windows of various shapes and sizes may be displayed for the retrieval and storage information, and such retrieval information and storage information windows may be displayed simultaneously with other windows.

As shown in FIG. 5, the picture storage information portion 10 of the screen display includes an area 11 for displaying data indicative of the time at which the picture data was received by the workstation 1, an area 12 for displaying information indicative of the file format of the received picture data, an area 13 for indicating the source (data network or telephone line) of the picture data, and an area 14 for displaying key word information that, as discussed below, may be entered by the operator. The storage information portion 10 also includes a storage actuation button area 15 and an erase button area 16. Further, the portion 10 includes a picture display area 17 which is divided into seven sub areas, in each of which a reduced size picture may be displayed. Associated with the picture display area 17 is a scroll bar 18 including a "moveable" shaded portion 19. It will be understood that the reduced size picture data generated at step S3 (FIG. 2) is the source of the data for displaying the reduced size pictures shown in the display sub areas of picture display area 17.

The intake date/time information displayed in area 11 of portion 10 is based upon date and time data that is automatically generated by clock/calendar module 34 (FIG. 1) each time picture data is received from the data network or the telephone line. The date and time data generated by the clock/calendar module 34 indicates the date and time at which the picture data is received.

The file format information shown in area 12 (FIG. 5) is provided on the basis of the analysis of the picture format that was performed at step S2 (FIG. 2). The picture source information shown at area 13 is indicative of whether the picture data was received via the data network or the telephone line.

At a position above the picture display area 17, information is provided concerning the number of pictures which are awaiting storage processing. For example, in the illustration of FIG. 5, it is assumed that 25 pictures have been received and are awaiting storage processing. In a preferred embodiment of the invention, the received picture data which is awaiting storage processing is temporarily stored, together with the reduced size picture data corresponding to the received picture data, in the buffer memory 35 of workstation 1 (FIG. 1).

For the sake of simplifying the drawing, the reduced size pictures displayed in display area 17 are not shown, but it should be understood that each of the seven sub areas of display area 17 is used for displaying a respective reduced size picture representative of a picture stored in buffer memory 35 and awaiting storage processing. In a preferred embodiment of the invention, the seven most recently received pictures are displayed, in reduced size form, in the display area 17 (if there are at least seven pictures awaiting storage processing), and the newest of the seven pictures is displayed in the upper-most of the seven display sub areas, with the respective pictures displayed in each of the other display sub areas appearing in a sequence such that each picture was received before the adjacent picture displayed immediately above. Moreover, if there are more than seven pictures waiting to be processed, older pictures than the newest seven may be "scrolled" by using the scroll bar 18. In particular, by using the mouse 22, the operator may "drag" shaded area 19 of the scroll bar 18 downward, and when the shaded area 19 is moved to the bottom of the scroll bar 18 and held there, the displayed pictures are scrolled upwards among the displayed sub areas of area 17 so that the next-older pictures appear in sequence starting at the bottom-most of the display sub areas, whereas the most recent pictures are scrolled upwards and ultimately out of the display area 17. It will be appreciated that the upward scrolling to obtain older pictures will end when the oldest picture in the queue comes to be displayed in the bottom-most of the seven display sub areas.

By a similar operation the operator may cause the more recent pictures again to be displayed by dragging the shaded portion 19 upwards to the top of scroll bar 18 and maintaining the shaded portion 19 at the top of the scroll bar 18 as the displayed reduced size pictures are scrolled downward, with the older pictures being scrolled "off the screen" and more recent pictures being scrolled onto the screen commencing at the upper-most of the seven display sub areas.

The scroll bar 18 is also operable to permit the operator to select one of the seven display pictures for storage processing. This may be done by positioning the shaded portion 19 adjacent to the reduced size display of the picture to be processed and then "clicking" the mouse. When one of the reduced size pictures displayed in area 17 is selected, the areas 11, 12 and 13 respectively display the time code, file format, and source information corresponding to the selected picture.

It should be understood that when a picture is received by the workstation 1 from either of the outside sources of picture data, the functions of steps S2, S3 and S4 are carried out, with the just-received picture being displayed at the upper-most sub area of display area 17. Because the operating system of the workstation 1 is multi-tasking, receipt of a new picture, and updating of the queue and the display of queued pictures, may occur concurrently with a picture storage or picture retrieval operation of the types to be described.

Because a split-screen format is provided, and the storage portion 10 of the screen is updated in real time to reflect receipt of new picture data, the operator is immediately made aware of the arrival of a new picture in the queue, even when storage or retrieval operations are taking place. Also, the operator can readily switch back and forth between storage and retrieval operations.

Assuming, now, that one of the seven pictures displayed in the display area 5 has been selected for storage processing, the procedure of FIG. 2 advances to step S5, at which it is determined whether the user has entered key word data with respect to the selected picture. The operator may enter key word data by entering alpha-numeric information, such as a word or words identifying the subject matter of the picture, by way of the keyboard 31. If such information is entered, then the same is displayed in the display area 14 (step S6). Otherwise, step S7 follows step S5. At step S7, it is determined whether the operator has actuated the storage key. Actuation of the storage key may be accomplished, for example, by positioning a cursor (such as an arrow) in the storage button area 15 and then "clicking" the mouse 32. Upon actuation of the storage key, step S8 follows, at which workstation 1 generates header data to be stored with the received picture data. In a preferred embodiment of the invention the header data includes the reduced size picture data previously formed at step S3, the time code information generated by clock/calendar module 34 and displayed in area 11 (FIG. 5) and also any key word information entered by the operator at step S5. As will be seen, the time code can be used as a key word for retrieving the stored picture data, even if the operator does not enter additional key word information.

The header data also preferably includes the file format information and the picture source information displayed at areas 12 and 13.

Although not shown in FIG. 5, the picture data management system according to the invention may also include a function which allows the operator to input information, referred to as "credit information", which identifies the organization which supplied the selected picture, the individual photographer who took the picture, a party to whom a royalty payment is due upon reproduction of the picture, etc. The credit information can be included in the header data, so that upon subsequent retrieval of the picture for printing in the newspaper, for example, an appropriate credit line can be generated for publication with the picture, or a copyright payment can be made, etc. Alternatively or in addition to operator input of credit information, the credit information may be received with the picture data from the data network or the telephone line.

Following step S8 is step S9, at which the workstation 1 performs certain desired image processing operations on the picture data to be stored so that, for example, a monochrome image in a certain color, such as red, will be provided upon retrieval of the data. Selection of the desired image processing may be carried out by the operator in response to, for example, menu or prompt screens or pull-down menus, which are not shown.

Step S9 is followed by step S10, at which the workstation 1 converts the data representing the time of receipt (also referred to as the "time code key word"), the data indicative of the file format, the reduced size picture data, and the operator-input key word information, if any, into a format that is appropriate for storage in the database. The routine next proceeds to step S11, at which the picture data, together with a header made up of the format-converted data including the reduced size picture data, the time code key word, the operator-input key word information, if any, and a file name, is stored in the database. In a preferred embodiment of the invention, the header data is stored in a table with a pointer or other arrangement for associating the header data with the corresponding stored picture data.

The procedure illustrated in FIG. 2 also permits received pictures temporarily stored in the buffer memory 35 to be erased rather than permanently stored. Accordingly, if instead of actuating storage key 15, the operator actuates erase button 16 (step S12), which may be done by positioning the cursor at the button 16 and then clicking the mouse, then the routine proceeds to step S13, at which the picture data for the currently selected picture of display portion 17 is erased from buffer memory 35, thereby eliminating that picture from the queue and causing the pictures below (i.e., older than) the erased picture to scroll upward by one picture.

It will be appreciated that after selection of one of the pictures shown in display area 17, the routine will simply cycle through steps S5, S7 and S12 until either the storage button 15 or the erase button 16 is actuated. It will also be appreciated that actuation of either the storage button 15 or the erase button 16 will cause the picture in question to be removed from the queue of pictures awaiting storage processing, although in the former case the picture is removed from the queue only upon permanent storage of the picture in the database.

A function for revising operator-input key word information may also advantageously be provided. For example, before actuation of the storage button 15 but after entry of key word information, the display area 14 may be selected by manipulation of the mouse, and the displayed key word information may be edited or deleted by pressing keys such as "delete" or "backspace" on the keyboard, and revised key word information may then be entered. Revision of operator-input key words after storage of the picture will be discussed below in connection with retrieval of stored pictures.

It should also be noted that although step S9, relating to generation of a desired raster image, is shown as following actuation of the storage key and generation of header data, this function may be performed earlier in the procedure, such as immediately before or after step S3, or at any other time after step S2 and before step S10.

In a preferred embodiment of the invention, step S11 entails transferring the picture data and the associated header data with the reduced size picture data and the time code from buffer memory 35 (i.e., RAM) to a permanent or quasi-permanent storage medium such as a floppy disk or a recordable optical disk via floppy disk drive 3 or optical disk recording/reproducing device 2. Alternatively, the picture database may be permanently stored on the hard disk 33, or, as another alternative, the buffer memory 35 may be implemented on the hard disk 33, with the storage in the database involving a transfer from the hard disk 33 to floppy disk drive 3 or optical disk recorder/reproducer 2.

Operation of the picture data management system for retrieval of stored pictures will now be described with reference to FIGS. 5 and 6.

Referring initially to FIG. 5, it will be recalled that the right-hand portion 20 of the split-screen display of FIG. 5 is devoted to displaying picture retrieval information. In particular the portion 20 includes a "display all pictures" button 21, a date/time retrieval parameter display area 22, a key word display area 23, logical function buttons 24, retrieval parameter initialization button 25, retrieve button 26, output button 27, and retrieved picture display area 28, the latter including seven display sub areas.

Associated with the retrieved picture display area 28 is a scroll bar 29 which has a shaded portion 30.

Figure 6:
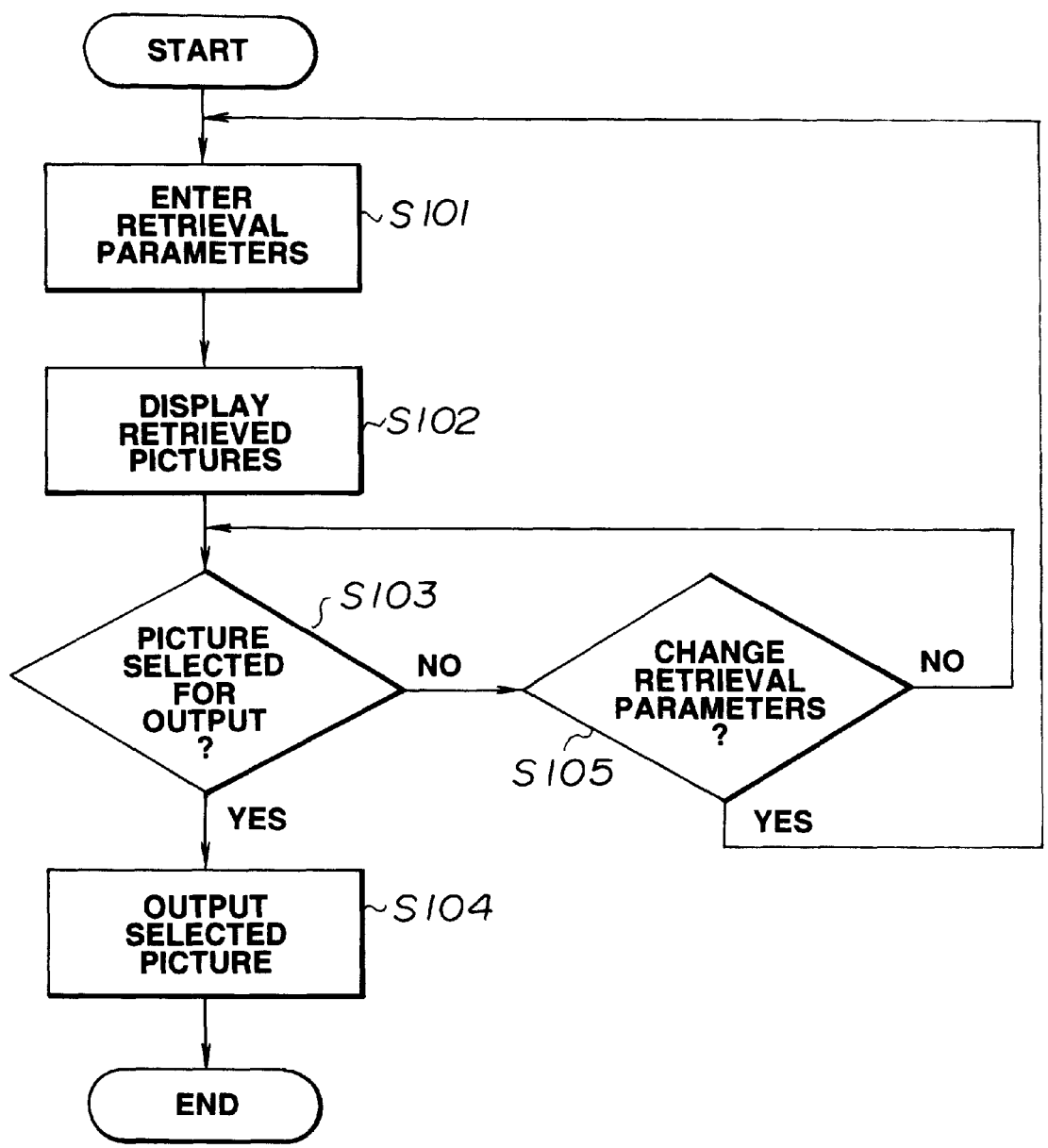
FIG. 6 is a flow chart that illustrates a procedure for retrieving stored picture data in accordance with the present invention.

FIG. 6, which will now be referred to in addition to FIG. 5, is a flow chart that illustrates picture retrieval operations in accordance with the present invention. For the purposes of the present discussion, it will be assumed that the picture database is maintained on the hard disk 33, although it should be understood that the database may, alternatively or in addition, be stored on the floppy disk in floppy disk drive 3 and/or on an optical disk present in optical disk recorder/reproducer 2.

The procedure of FIG. 6 is initiated whenever the operator of the system desires to retrieve a picture that has been stored in the picture database. The operator may, for example, indicate that a picture retrieval operation is to begin by manipulating the mouse 32 so that the cursor is moved from the picture storage portion 10 of the screen display over to the picture retrieval portion 20 of the display.

The procedure of FIG. 6 begins with step S101, in which the operator enters the retrieval parameters to be used in retrieving the desired picture or pictures. The retrieval parameters may be entered in a number of different ways.

A first way in which retrieval parameters may be entered is simply by actuating the "display all" button 21, in which case all of the pictures in the picture database will be displayed in a sequence that preferably begins with the most recently received pictures and continues in order to the oldest of the pictures in the database.

A more limited retrieval period may be selected by entering one or two dates (which may also include a time of day) via the keyboard 31. The date or dates entered are then displayed in the "date/time of intake" display area 22 of the display portion 20.

It will be noted that there are associated with the display area 22 indicators labeled "before period", "after period", and "within period". If only one date has been entered and is displayed in the display area 22, then either the "before period" or the "after period" indicators may be selected by, for example, using the mouse to position the cursor on the desired indicator and then clicking the mouse button. If the "before period" indicator is selected, then all pictures stored in the database which were received on or before (or alternatively, exclusively before) the entered date are to be retrieved. Preferably the retrieval begins with the last picture received on the selected date and then continues sequentially in order to the oldest picture in the database. If the "after period" indicator is selected, then the pictures to be retrieved from the database are all of those that have been received on or after (or alternatively, exclusively after) the entered date. Preferably retrieval begins with the picture stored in the database that was most recently received and continues sequentially to the oldest picture in the database that was received on or after the entered date.

If two dates are entered, then preferably the "within period" indicator is automatically selected and the pictures to be retrieved from the database are those which were received on or after the earlier of the two dates and on or before the later of the two dates (again, the picture data management system may alternatively be arranged so that the beginning and ending dates are construed as exclusive, rather then inclusive).

As an alternative method of using two dates for defining a retrieval period, the picture data management system may include the option of selectively deactivating the "within period" indicator at a time when two dates have been entered, in which case the pictures to be retrieved from the database are those which were received (on or) before the earlier of the two dates and also those which were received (on or) after the later of the two dates, with the pictures received between the two dates not being retrieved. It will be appreciated that virtually the same result in terms of retrieving all pictures in the database except those received during the period defined between two dates could also be obtained in a two step operation in which, for example, all of the pictures received before the earlier date were retrieved and then all of the pictures received after the later date were retrieved.

It will be seen from all of the foregoing that the time code, automatically generated and associated with each of the stored pictures during the picture storage operation as previously described, is in effect used as a key word which allows retrieval based on the respective times of receipt of the pictures stored in the database.

Because the picture storage operations described above included, at the operator's option, assignment of a key word or words (in addition to the time code) to each of the pictures at the time of storage, retrieval using the operator-assigned key words can also be accomplished. This can be done by entering alpha-numeric information corresponding to one of the previously assigned key words via the keyboard 31. The entered information is displayed in the key word display area 23 of the display portion 20.

It will be appreciated that if only alpha-numeric key words corresponding to those that have been previously been assigned by an operator are used, then the retrieval process per se is similar to conventional methods using key words. However, the key word displayed in display area 23 may be logically combined with a retrieval period based on a date or dates displayed in display area 22. For example, if information is displayed in both of the areas 22 and 23, the picture data management system may be arranged so that one of the logical function indicators 24 (for example the "AND" indicator) may be automatically activated. In that case, the operator has the option of activating the other logical function, namely the "OR" function. Retrieval of stored pictures will then be performed on the basis of the logically combined time code and operator-assigned key word retrieval parameters, as selected by the operator.

It will be appreciated that the picture data management system may be arranged to analyze information input during picture retrieval operations via keyboard 31 in order determine whether the input information is indicative of a date or of an alpha-numeric key word, so that the entered information is automatically displayed in the appropriate one of the display areas 22 and 23. Alternatively, the system may be arranged so that the operator selects one of the areas 22 or 23 (using the mouse to move a cursor, for example,) with the entered information then being displayed in the selected one of the two displays.

When all of the desired date and/or alpha-numeric key word information has been entered, and a logical function selected, if appropriate, then the operator proceeds to actuate retrieve button 26. In response to actuation of retrieve button 26, the system proceeds to retrieve all of the stored pictures that meet the entered retrieval information, and the retrieved pictures are then displayed in the sub areas of display area 28 (step S102, FIG. 6). It should be noted that if the "display all" button 21 is actuated, this has the effect of also actuating the retrieve function so that the retrieve button 26 does not need to be actuated after the "display all" button 21. The retrieval operation may entail, for example, searching the table of header data in the database to find pictures which satisfy the retrieval parameters.

It should also be noted that if the operator desires to change the retrieval information displayed in the areas 22 and 23 before actuating the retrieve button 26, or if the operator wishes to commence a new retrieval operation instead of a retrieval operation which is being or already has been performed, then the operator may actuate the initialize button 25, which clears the display areas 22 and 23 and allows the operator to enter new retrieval information, including, if desired, the "display all" option.

As noted above, if retrieval is to be performed other than through the "display all" option, the retrieval process entails searching through the header data associated with the stored pictures on the hard disk to determine which of the stored pictures meet the retrieval criteria entered by the operator. With respect to the pictures which meet the criteria, preferably at least a pointer to the location on the hard disk is retrieved and stored in working memory, together with the associated reduced size picture data which are present in the header data. When the retrieval operation is complete, the number of pictures retrieved is indicated by a legend displayed above the display area 28, and reduced size pictures corresponding to the retrieved pictures are displayed in the sub areas of the display area 28. Preferably, as in the case of the storage operation, the reduced size pictures corresponding to the retrieved pictures are displayed in reverse order of receipt, with the most recent picture displayed in the upper-most of the display sub areas of display area 28 and the less recently received pictures then displayed in sequence in reverse order of receipt in the display sub areas below the upper-most display sub area. If the number of pictures exceeds seven, which is the number of display sub areas, then the older of the retrieved pictures can be scrolled into the display area 28 (with the newest of the retrieved pictures being scrolled out) by using the scroll bar 29 and its shaded area 30 in a similar manner to that described with respect to the scroll bar 18 in the display portion 10. In particular, the mouse can be used to drag the shaded portion 30 of the scroll bar 29 down to the bottom of the scroll bar 29, and if the dragging operation is maintained after the shaded portion 30 is at the bottom of the scroll bar 29, then the scrolling of the older pictures into the display area 28 occurs.

The shaded portion 30 can also be used to select a desired one of the pictures displayed in the display area 28 by moving the shaded area 30 so that it is adjacent to the desired picture and then, for example, clicking the mouse button. Once a picture has been selected, the operator can select either a "printer" or an "external" output mode (which are respectively represented by indicators associated with the output button 27) and then may actuate the output button 27.

Accordingly, and referring again to FIG. 6, after step S102, at which the retrieved pictures are displayed, the system awaits selection of a picture for output (step S103) and if a picture is selected for output, then the system proceeds to step S104 and outputs the selected picture in accordance with the selected output mode. If the printer was selected as the output mode, then the work station 1 converts the retrieved picture data into an appropriate format for output via the printer 4 and the converted data is then outputted to the printer 4, which prints a hard copy of the desired picture. Alternatively, if the external output mode is selected, then again any necessary data conversion is performed and the converted picture data is output to the data network via the terminal 6. It will be noted that although not shown in the display of FIG. 5, sub options may be provided under the "external" output mode so that operator can select between outputting the picture data to the data network via the terminal 6 and outputting the picture data via the telephone line, using the modem 8 and the terminal 7.

Although not shown in FIG. 5, it should be understood that a function may be provided whereby the operator can cause a selected retrieved picture to be displayed full size on the monitor 5 and then can return to the split-screen display of FIG. 5. This function could be carried out, for example, using a pull-down menu or keyboard function keys (not shown). Such a full screen display function could also be provided with respect to a picture selected from the queue during the storage operation described above.

According to another function that may be provided in the picture data management system, the operator-input key word for a selected retrieved picture can be displayed and edited, in a dialog box for example. The edited key word is then stored in the database.

Referring once again to FIG. 6, at times when the system is awaiting selection of a picture for output, it is also possible to change the retrieval parameters (step S105) by actuating the initialize key 25, in which case the routine of FIG. 6 returns to step S101 to permit entry of new retrieval information. At the same time, preferably the display area 28 is cleared, and the pointers and reduced size picture data from the previously retrieved pictures are also preferably cleared from the working memory.

Thus the picture data management system is operable so that a hard copy can be generated from a selected retrieved picture, or a selected retrieved picture can be communicated in data form to another workstation. It will be appreciated that other forms of output may also be optionally provided, such as displaying the selected retrieved picture in full size on the monitor 5, or on another monitor or display unit (not shown) connected to the picture data management system. It is also within the contemplation of this invention that a selected retrieved picture be output to another device for storage on a recording medium such as a magnetic tape or a recordable video disk.

Furthermore, in the picture data management system as described above, a reduced size picture is automatically generated for each picture that is received, and when a picture is stored in the database, the corresponding reduced size picture is stored therewith. In this way, retrieval operations are facilitated by displaying plural reduced pictures at the same time so that selection among retrieved pictures can be readily performed. Also, the reduced size pictures formed at the time the pictures are received can facilitate the operator's decision whether to store a newly received picture, since plural reduced pictures corresponding to the newly received pictures can be simultaneously displayed so that the operator can readily determine whether the newly received picture has already been stored in the database, or is not to be stored for some other reason.

In addition, a time code is automatically generated and stored as a key word for the picture data so that it is not necessary for the operator to generate and assign a key word to each picture during the storage process. In this way, less time and effort is required for receiving and storing pictures, and during retrieval the time at which the pictures were received can be used as key word data. An advantage of time-based indexing and retrieval of the picture data is that an operator who wishes to retrieve a picture concerning a particular event, need only recall the date on which the event occurred and enter retrieval information accordingly, in order to readily find the desired picture.

Accordingly, the picture data management system as described above is capable of conveniently receiving and storing picture data as well as retrieving, displaying and outputting the received and stored picture data.

Although in the embodiment of the invention as described above, the picture database has been described as consisting of picture data received "by wire", that is, via a data network or telephone line, the invention is not limited thereto. For example, some or all of the picture database could be provided to the system in the form of a prerecorded optical or floppy disk, in which the data for each picture are stored in association with a corresponding date or time code and reduced size picture data. The time code and reduced size picture data may, but need not be, stored as header data, as in the embodiment previously described. As an alternative, the association between the time codes and reduced picture data and the corresponding full size picture data may be accomplished by means of look-up tables or the like. (It will be appreciated that look-up tables could also be used in the embodiment described above, as an alternative to the headers including the time code, reduced size picture data, etc.).

As another alternative, a large part or all of the picture database may be down-loaded at one time to the workstation 1, rather than having pictures transmitted and received one by one, and screened one by one for storage, as was previously described. In this case, a time code for each picture is preferably included in the down-loaded data. The down-loaded data may be stored, for example, on the hard disk. In either the down-load or prerecorded medium examples, additional preassigned key words may be included in the data.

In an alternative embodiment of the invention, the reduced size picture data is not, at least in some cases, stored in the database. Rather, the reduced size picture data is formed when it is needed for display, that is, when the picture data is initially received, or when a previously stored picture is retrieved. In other words, in this alternative embodiment, the reduced size picture data is formed on such occasions when a reduced size picture needs to be displayed with other reduced size pictures on the monitor 5 and at other times the reduced size picture data is not stored or maintained in memory. This alternative approach may require longer processing time and/or more powerful processing circuitry, but would permit more efficient utilization of the storage capacity of the system.

It is also within the contemplation of this invention to use time-based indexing techniques for the picture database in addition to the approach previously described in which a respective time code is associated with each stored picture. For example, the pictures could be stored in groups or categories, each of which corresponds to a respective time period, such as a particular day, week, month or year. In this way, time-period based retrieval could still be performed, even without assigning a time code to each picture.

As another alternative, and assuming again that time codes are to be assigned to each picture, the time code could be based on the date (and possibly also the time) of storage, of original taking of the picture, or on some other basis.

Furthermore, in the above description of selecting desired retrieval time periods, the periods were based upon starting and/or ending points in time. However, the desired retrieval periods could be expressed in other ways, such as a given day, week, month or year. For example, a suitable pull-down menu and dialog box could be provided in the user interface (but are not shown herein), so that the operator is prompted to make an entry such as "July, 1992" in which case all pictures with time codes corresponding to the selected month of July, 1992, would be retrieved.

To make explicit what has been implied above, the user interface may include, in addition to or as a substitute for the mouse-based interface described herein, an interface which includes menu screens, positioning of a cursor by arrow keys that are part of the keyboard 31, dedicated function keys located on the keyboard 31, selection of functions using an "enter" key on the keyboard 31, etc. Also, the mouse-based interface as previously described may include pull-down menus, dialog boxes and other conventional elements of user interfaces for microcomputer systems. A touch screen or the like could also be used.

Although it is particularly advantageous to use both time-based indexing and retrieval of pictures and simultaneous display of plural reduced size pictures together in a single picture data management system, it is within the contemplation of the invention that only one of these features be included in a picture data management system.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A picture data management apparatus for storing and retrieving picture data, comprising:

means for receiving respective picture data representative of a plurality of pictures, and for receiving credit information including at least one indicia of source or ownership for at least one of said pictures;

means for generating a respective time code for each of said plurality of pictures indicative of the time of receipt of each of said pictures by said means for receiving;

means for receiving a respective storage or elimination command at a time subsequent to the time of receipt of the respective picture data;

means for selectively storing or eliminating the respective received picture data, credit information and time code indicative of the time of receipt of each of said pictures by said means for receiving, which is prior to the time of storage or elimination, for each of said plurality of pictures in association with said time code corresponding to the respective received picture data in response to the respective storage or elimination command;

means for entering retrieval parameter information indicative of a selected time period indicative of the time of receipt of particular picture data by said means for receiving;

retrieving means for retrieving the stored picture data for which said time codes correspond to said selected time period, thus indicating that the retrieved picture data was received by said means for receiving during said selected time period; and output means for outputting the stored picture data retrieved by said retrieving means, said output means being further adapted to output said credit information with the stored picture data to selectively provide the credit information therewith or indicate whether and to whom further payment must be made.

2. The picture data management apparatus according to claim 1, wherein said retrieval parameter information specifies a starting time for said selected time period.

3. The picture data management apparatus according to claim 2, wherein said retrieval parameter information also specifies an ending time for said selected time period.

4. The picture data management apparatus according to claim 1, wherein said retrieval parameter information specifies an ending time for said selected time period.

5. The picture data management apparatus according to claim 1, further comprising means for displaying simultaneously storage information related to storage of said received picture data and retrieval information related to retrieval of said stored picture data.

6. The picture data management apparatus according to claim 5, wherein said storage information and said retrieval information are displayed in a split-screen format in which a first portion of said split-screen format is devoted to said storage information and a second portion of said split-screen format is devoted to said retrieval information.

7. The picture data management apparatus according to claim 1, wherein said means for receiving is connected to a data network.

8. The picture data management apparatus according to claim 1, wherein said means for receiving is connected to a telephone line.

9. The picture data management apparatus according to claim 1, wherein said means for storing comprises a hard disk.

10. The picture data management apparatus according to claim 1, wherein the respective received picture data for each of said plurality of pictures is stored in association with respective header data and said respective header data includes said time code corresponding to the respective received picture data.

11. The picture data management apparatus according to claim 10, wherein said means for receiving is connected to a data network and to a telephone line and is adapted to selectively receive said respective picture data from one of said data network and said telephone line.

12. The picture data management apparatus according to claim 11, wherein said respective header data includes data indicative of a source of said respective received picture data, said source being one of said data network and said telephone line.

13. The apparatus according to claim 1, wherein said selected time period is a time of storage period.

14. The apparatus according to claim 1, wherein said selected time period is a time of receipt period.

15. A picture data management apparatus for storing and retrieving picture data, comprising:
- means for receiving respective picture data representative of a plurality of pictures, and for receiving credit information including at least one indicia of source or ownership for at least one of said pictures;
- means for generating a respective time code for each of said plurality of pictures indicative of the time of receipt of each of said pictures by said means for receiving;
- reduced size picture means for forming reduced size picture data for each of said plurality of pictures;
- means for storing the respective received picture data, credit information and time code indicative of the time of receipt of said pictures by said means for receiving, which is prior to the time of storage for each one of said plurality of pictures and for storing in association therewith said reduced size picture data corresponding to said each one of said plurality of pictures;
- means for entering retrieval parameter information indicative of a selected time period indicative of the time of receipt of particular picture data by said means for receiving;
- retrieving means for retrieving the stored picture data and the associated reduced size picture data for which said time codes correspond to said selected time period, thus indicating that the retrieved picture data was received by said means for receiving during said selected time period;
- means for simultaneously displaying a plurality of reduced size pictures corresponding to the retrieved reduced size picture data; and
- output means for outputting the stored picture data retrieved by said retrieving means, said output means being further adapted to output said credit information with the stored picture data to selectively provide the credit information therewith or indicate whether and to whom further payment must be made.

16. The picture data management apparatus according to claim 15, wherein said reduced size picture means forms said reduced size picture data by thinning out said received picture data.

17. The picture data management apparatus according to claim 15, further comprising a buffer memory for temporarily storing the received picture data and the reduced size picture data formed by the reduced size picture means before said received picture data and said reduced size picture data are stored in said means for storing.

18. The picture data management apparatus according to claim 17, further comprising operator input means and means, responsive to said operator input means, for selectively transferring to said means for storing the received picture data and the reduced size picture data stored in said buffer memory.

19. The picture data management apparatus according to claim 18, further comprising means, responsive to said operator input means, for selectively erasing the received picture data and the reduced size picture data stored in said buffer memory.

20. The picture data management apparatus according to claim 17, wherein said means for displaying has a predetermined number of display areas for displaying a like number of reduced size pictures corresponding to the picture data stored in said buffer memory, and wherein said means for displaying displays the reduced size pictures corresponding to most recently received picture data when a number of pictures for which received picture data is stored in said buffer memory exceeds said predetermined number of display areas.

21. The picture data management apparatus according to claim 15, wherein said means for receiving is connected to a data network.

22. The picture data management apparatus according to claim 15, wherein said means for receiving is connected to a telephone line.

23. The picture data management apparatus according to claim 15, wherein said means for storing comprises a hard disk.

24. The picture data management apparatus according to claim 15, wherein the respective received picture data for each of said plurality of pictures is stored in association with respective header data and said respective header data includes respective reduced size picture data corresponding to the respective received picture data.

25. The picture data management apparatus according to claim 24, further comprising means for indexing said stored picture data in accordance with respective times at which said stored picture data was received; and wherein said means for storing is operative to store said respective received picture data and the respective reception times at respective times subsequent to said respective reception times, and said means for retrieving comprises means for retrieving such portions of the indexed and stored picture data as were received during a selected time period.

26. The picture data management apparatus according to claim 25, wherein said respective header data also includes a time code indicative of a time at which the respective picture data was received.

27. The picture data management apparatus according to claim 24, wherein said means for receiving is connected to a data network and to a telephone line and is adapted to selectively receive said respective picture data from one of said data network and said telephone line.

28. The picture data management apparatus according to claim 27, wherein said respective header data includes data indicative of a source of said respective received picture data, said source being one of said data network and said telephone line.

29. The picture data management apparatus according to claim 15, further comprising means for detecting reception of said picture data by said means for receiving, and wherein said reduced size picture means is operative to form said reduced size picture data upon the detection of said reception of said picture data by said means for detecting.

30. The apparatus according to claim 15, wherein said selected time period is a time of storage period.

31. The apparatus according to claim 15, wherein said selected time period is a time of receipt period.

32. A picture data management apparatus for storing and retrieving picture data, comprising:

means for receiving respective picture data representative of a plurality of pictures, and for receiving credit information including at least one indicia of source or ownership for at least one of said pictures;

means for generating a respective time code for each of said plurality of pictures indicative of the time of receipt of each of said pictures by said means for receiving;

reduced size picture means for forming reduced size picture data for each of said plurality of pictures;

means for receiving a respective storage command at a time subsequent to the time of receipt of the respective picture data and credit information;

means for assigning respective keyword data for each of said plurality of pictures;

means for combining said respective time codes indicative of the time of receipt of each of said pictures by said means for receiving, which is prior to the time of receipt of said respective storage command, reduced size picture data and keyword data corresponding to respective received picture data to form header data associated with said respective received picture data;

means for storing the respective received picture data and associated respective header data in response to the respective storage command;

means for entering retrieval data;

retrieving means for retrieving the stored picture data corresponding to stored header data that conforms to said entered retrieval data;

means for reading out from said means for storing the reduced size picture data corresponding to the retrieved picture data;

means for displaying simultaneously a plurality of reduced size pictures corresponding to the read-out reduced size picture data; and output means for outputting the stored picture data retrieved by said retrieving means, said output means being further adapted to output said credit information with the stored picture data to selectively provide the credit information therewith or indicate whether and to whom further payment must be made.

33. The picture data management apparatus according to claim 32, wherein said retrieval data includes retrieval parameter information indicative of a selected time period.

34. The picture data management apparatus according to claim 33, wherein said retrieval parameter information specifies a starting time for said selected time period.

35. The picture data management apparatus according to claim 33, wherein said retrieval parameter data specifies an ending time for said selected time period.

36. The picture data management apparatus according to claim 32, wherein said means for displaying simultaneously is also operative to display storage information related to storage of said received picture data and retrieval information related to retrieval of said stored picture data.

37. The picture data management apparatus according to claim 36, wherein said storage information and said retrieval information are displayed in a split-screen format in which a first portion of said split-screen format is devoted to said storage information and a second portion of said split-screen format is devoted to said retrieval information.

38. The picture data management apparatus according to claim 32, wherein said means for receiving is connected to a data network.

39. The picture data management apparatus according to claim 32, wherein said means for receiving is connected to a telephone line.

40. The picture data management apparatus according to claim 32, wherein said means for receiving is connected to a data network and to a telephone line and is adapted to selectively receive said respective picture data from one of said data network and said telephone line.

41. The picture data management apparatus according to claim 40, wherein said respective header data includes data indicative of a source of said respective received picture data, said source being one of said data network and said telephone line.

42. The picture data management apparatus according to claim 32, further comprising a buffer memory for temporarily storing the received picture data and the reduced size picture data formed by the reduced size picture means before said received data and said reduced size data are stored in said means for storing.

43. The picture data management apparatus according to claim 42, further comprising operator input means and means, responsive to said operator input means, for selectively transferring to said means for storing the received picture data and the reduced size picture data stored in said buffer memory.

44. The picture data management apparatus according to claim 43, further comprising means, responsive to said operator input means, for selectively erasing the received picture data and the reduced size picture data stored in said buffer memory.

45. The picture data management apparatus according to claim 32, wherein said means for storing comprises a hard disk.

46. A method of storing and retrieving picture data, comprising the steps of:

receiving respective picture data representative of a plurality of pictures, and receiving credit information including at least one indicia of source or ownership for at least one of said pictures;

generating a respective time code for each of said plurality of pictures indicative of the time of receipt of each of said pictures;

receiving a respective storage or elimination command at a time subsequent to said time of receipt of the respective picture data and credit information;

selectively storing or eliminating said received picture data credit information and time code indicative of the time of receipt of each of said pictures, which is prior to the time for storage or elimination, in association with said time code corresponding to the respective received picture data in response to the respective storage or elimination command;

indexing said stored picture data in accordance with respective time codes so that said stored picture data is indexed in accordance with the time of receipt of said picture data;

retrieving such portions of the indexed and stored picture data for which said time codes correspond to a selected time period, thus indicating that the retrieved picture data was received during said selected time period;

outputting at least a portion of said indexed and stored picture data; and outputting the credit information associated with said retrieved portions of said picture data with the stored picture data to selectively provide the credit information therewith or indicate whether and to whom further payment must be made.

47. The method according to claim 46, wherein said storing and indexing steps are performed substantially simultaneously.

48. The method according to claim 46, wherein said selected time period is a time of storage period.

49. The method according to claim 46, wherein said selected time period is a time of receipt period.

50. A method of storing and retrieving picture data, comprising the steps of:

receiving respective picture data representative of a plurality of pictures, and receiving credit information including at least one indicia of source or ownership for at least one of said pictures;

generating a respective time code for each of said plurality of pictures indicative of the time of receipt of each of said pictures;

storing said respective picture data, credit information and time code indicative of the time of receipt of each of said pictures, which is prior to the time of storage;

forming respective reduced size picture data for each of said plurality of pictures;

storing the respective reduced size picture data for each one of said plurality of pictures and storing in association therewith said respective picture data, credit information and time code;

receiving retrieval parameter information indicative of a selected time period;

retrieving the stored reduced size picture data for which said time codes correspond to said selected time period, thus indicating that the retrieved reduced size picture was received during said selected time period;

displaying simultaneously a plurality of reduced size picture data which correspond to said selected time period;

selecting at least one of said reduced size picture data;

outputting said stored picture data associated with said selected reduced size picture data; and outputting the credit information associated with said output portions of said picture data to selectively provide the credit information therewith or indicate whether payment must be made.

51. The method according to claim 50, wherein said storing steps are performed substantially simultaneously and said forming step is performed before said storing steps.

52. The method according to claim 51, wherein the respective picture data and the associated reduced size picture data are stored on an optical disk.

53. The method according to claim 51, further comprising the steps of receiving and temporarily storing said respective picture data before said forming step.

54. The method according to claim 51, wherein said respective picture data are stored in association with respective header data which includes the reduced size picture data formed for the corresponding picture.

55. The method according to claim 50, further comprising the steps of generating a second repetive time code indicative of a time of receipt of the respective picture data for each of said plurality of pictures, receiving a respective storage command at a time subsequent to said time of receipt of the respective picture data, and wherein the step of storing said respective picture data representative of said plurality of pictures comprises storing said second time code corresponding to the respective received picture data in association with each of said plurality of pictures in response to the respective storage command.

56. The method according to claim 50, further comprising the step of detecting reception of said picture data, and wherein the step of forming respective reduced size picture data for each of said plurality of pictures is carried out upon the detection of said reception of said picture data.

57. The method according to claim 50, wherein said selected time period is a time of storage period.

58. The method according to claim 50, wherein said selected time period is a time of receipt period.

* * * * *